Patented June 28, 1927.

1,634,006

UNITED STATES PATENT OFFICE.

VICTOR YNGVE, OF SOUTH ORANGE, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY CELL.

No Drawing. Application filed January 12, 1925. Serial No. 1,922.

This invention relates to dry cells and more particularly to a new and useful method of making dry cells of the Le Clanche type.

It has been customary in this art intimately to mix manganese dioxide and graphite or other carbonaceous material of the required degree of fineness, and then to add ammonium chloride in solid condition to this mixture. Then a solution containing zinc chloride and some more ammonium chloride was added, whereupon the resultant mix was ready for use in the preparation of dry cells.

The preparation of dry battery mix in the above described manner is a dusty and therefore troublesome operation and the presence of relatively large crystals of ammonium chloride makes the uniform distribution thereof practically impossible. Furthermore, when the cell is subjected to a current drain the crystals of ammonium chloride are dissolved, leaving voids throughout the mixture. Another objection to this method of preparing a battery mix is that it involves a large number of separate weighing operations, with the resultant danger of error.

In accordance with the present invention the disadvantages of this method of preparing dry batteries are avoided by mixing the necessary manganese dioxide graphite or other carbonaceous material and ammonium chloride together, preferably in a ball or pebble mill. I prefer to do this milling in batches, although it can be done equally well by a continuous process of milling.

To exemplify the manner in which my invention is practiced, I shall give certain proportions which have been found satisfactory: 300 pounds of manganese dioxide ore of suitable grade, 100 pounds of graphite, and 40 pounds of ammonium chloride are milled together until the required degree of fineness is obtained. Preferably, this milling is continued until at least 95% of the material passes through a 200 mesh screen. All these materials are milled in a dry condition and when removed from the mill separate batches are weighed out and the electrolyte solution is added to each batch in a suitable mixer. The resultant battery mix is of great uniformity of composition and dry cells made up of such a mix show a greater uniformity in amperage and service than was heretofore obtainable.

It would be obvious to those skilled in the art that the proportions of materials hereinbefore specified may be varied, depending on requirements, and that any of the materials usually employed in the art may be substituted for the manganese dioxide ore, graphite, and the particular salts hereinbefore enumerated.

What I claim is:

1. The method of preparing dry cell mixture which consists in milling together separate dry depolarizing and carbonaceous materials and a salt, and then adding to the milled product electrolyte.

2. The method of preparing dry cell mixture which consists in milling together separate portions of dry manganese dioxide, graphite and ammonium chloride, and then adding to the milled mixture the electrolyte.

3. The method of preparing dry cell mixture which consists in milling together separate dry portions of each of manganese dioxide ore and graphite and crystals of ammonium chloride until at least 95% of the milled mixture passes through a 200 mesh screen, then dividing the milled mixture into batches and then finally adding electrolyte.

In testimony whereof, I have signed my name to this specification, this ninth day of January, 1925.

VICTOR YNGVE.